(12) United States Patent
Imagawa et al.

(10) Patent No.: US 11,972,554 B2
(45) Date of Patent: Apr. 30, 2024

(54) BEARING DISPLACEMENT DETECTION DEVICE AND METHOD

(71) Applicant: Panasonic Intellectual Property Management Co., Ltd., Osaka (JP)

(72) Inventors: Taro Imagawa, Osaka (JP); Akihiro Noda, Osaka (JP); Yuki Maruyama, Osaka (JP); Hiroya Kusaka, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 443 days.

(21) Appl. No.: 17/132,878

(22) Filed: Dec. 23, 2020

(65) Prior Publication Data

US 2021/0118116 A1    Apr. 22, 2021

Related U.S. Application Data

(63) Continuation of application No. PCT/JP2019/034681, filed on Sep. 4, 2019.

(30) Foreign Application Priority Data

Sep. 27, 2018 (JP) .................................. 2018-181149

(51) Int. Cl.
*G06T 7/00* (2017.01)
*G01M 99/00* (2011.01)
*G06T 7/246* (2017.01)

(52) U.S. Cl.
CPC ............ *G06T 7/001* (2013.01); *G01M 99/00* (2013.01); *G06T 7/246* (2017.01); *G06T 7/0004* (2013.01);
(Continued)

(58) Field of Classification Search
CPC .... G01M 99/00; G01M 13/04; G01M 11/081; G01M 5/0008; E01D 22/00; E01D 19/04;
(Continued)

(56) References Cited

U.S. PATENT DOCUMENTS

| 2011/0044509 A1* | 2/2011 | Huang ................... G06T 7/001 |
| | | 382/107 |
| 2016/0171309 A1* | 6/2016 | Hay ....................... A61B 5/01 |
| | | 348/143 |

(Continued)

FOREIGN PATENT DOCUMENTS

| CN | 207502197 | 6/2018 |
| JP | 8-278116 | 10/1996 |

(Continued)

OTHER PUBLICATIONS

Shariati, "Video based structural heath monitoring using virtual visual sensors" (Year: 2016).*

(Continued)

*Primary Examiner* — Kenny A Cese
(74) *Attorney, Agent, or Firm* — Wenderoth, Lind & Ponack, L.L.P.

(57) ABSTRACT

A detection device includes an acquirer that acquires a video of each of a plurality of bearings of a structure including the plurality of bearings, an extractor that extracts a dynamic feature corresponding to a plurality of degrees of freedom of each of the plurality of bearings based on the video, and an identifier that identifies, among the plurality of bearings, a bearing whose dynamic feature fails to match a dynamic feature of one or more other bearings of the plurality of bearings.

9 Claims, 9 Drawing Sheets

(52) U.S. Cl.
CPC ........... *G06T 2207/10016* (2013.01); *G06T 2207/30108* (2013.01); *G06T 2207/30184* (2013.01)

(58) Field of Classification Search
CPC ........... G06T 7/20; G06T 7/246; G06T 7/001; G06T 2207/10016; G06T 2207/30184; G06T 2207/30108; G06T 2207/30132; G06T 7/0004; G06T 2207/30164; G06T 7/0002
See application file for complete search history.

(56) References Cited

U.S. PATENT DOCUMENTS

| | | | |
|---|---|---|---|
| 2016/0300341 A1* | 10/2016 | Hay | G06F 3/04847 |
| 2017/0038307 A1* | 2/2017 | Ohta | G01N 21/88 |
| 2017/0243366 A1 | 8/2017 | Imagawa | |
| 2020/0284686 A1* | 9/2020 | Li | G01M 5/0091 |

FOREIGN PATENT DOCUMENTS

| | | |
|---|---|---|
| JP | 11-303020 | 11/1999 |
| JP | 2002-131234 | 5/2002 |
| JP | 2003-214829 | 7/2003 |
| JP | 2014-173313 | 9/2014 |

OTHER PUBLICATIONS

Zhao et al., "Bridge Displacement Monitoring Method Based on Laser Projection-Sensing Technology", Sensors 2015, 15. 8444-8463 (Year: 2015).*
International Search Report (ISR) dated Nov. 19, 2019 in International (PCT) Application No. PCT/JP2019/034681.
Extended European Search Report dated Oct. 25, 2021 in corresponding European Patent Application No. 19866220.7.
Office Action and Search Report dated Aug. 25, 2023 in corresponding Chinese Patent Application No. 201980042487.0 (with English translation of Search Report).

* cited by examiner

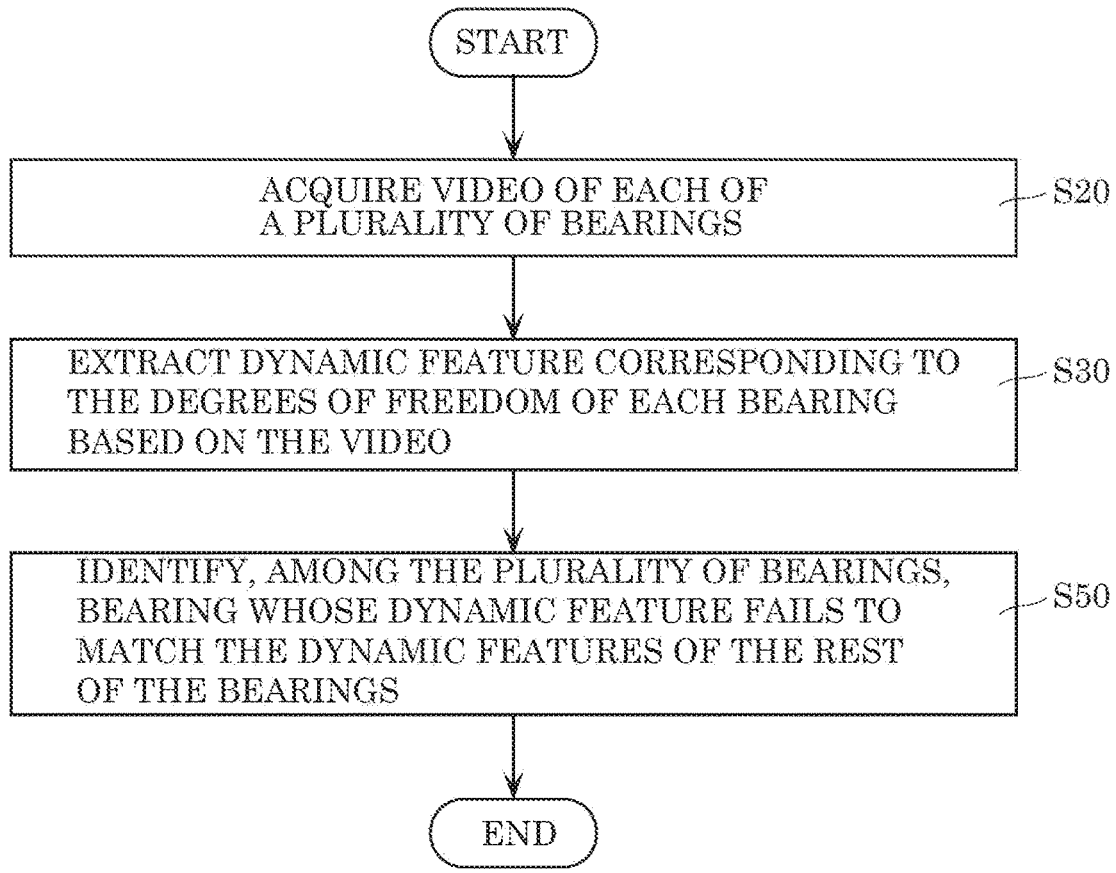
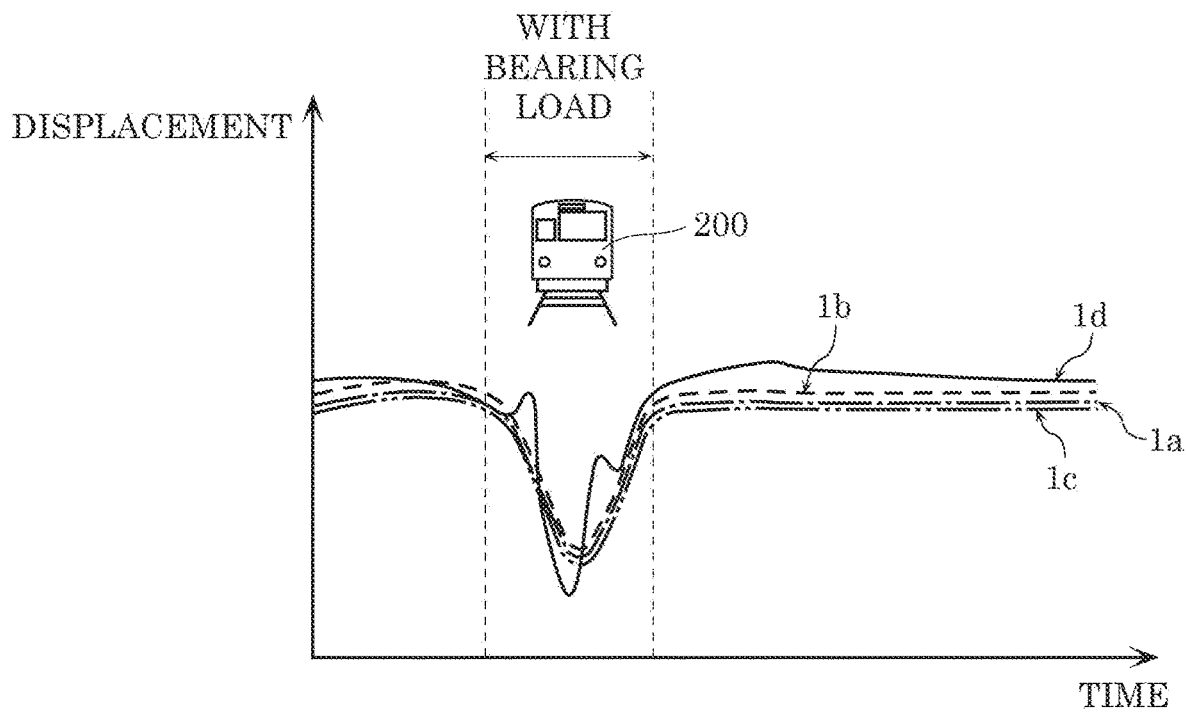

BEARING DISPLACEMENT DETECTION DEVICE AND METHOD

CROSS REFERENCE TO RELATED APPLICATIONS

This application is a U.S. continuation application of PCT International Patent Application Number PCT/JP2019/034681 filed on Sep. 4, 2019, claiming the benefit of priority of Japanese Patent Application Number 2018-181149 filed on Sep. 27, 2018, the entire contents of which are hereby incorporated by reference.

BACKGROUND

1. Technical Field

The present disclosure relates to a detection device and a detection method for detecting a problem in a bearing that supports a structure.

2. Description of the Related Art

Conventionally, bearings that support a piece of infrastructure such as a bridge are inspected regularly by workers through visual inspection or acoustic inspection of the bearings for the bridge or the like. However, in a case where a piece of infrastructure is a bridge, for example, the bearings are installed on raised structures such as the bridge piers or the abutments. This makes it difficult to inspect the bearings, depending on where the bearings are installed, and in turn imposes a burden on the workers. Accordingly, needs exist for a method of inspecting a piece of infrastructure efficiently with a reduced burden on the workers.

For example, Patent Literature 1 discloses a method of evaluating the degree of damage in bearings. According to this method, a non-contact sensor, such as a laser Doppler speedometer, is attached to a bridge pier, and vibrations in an end portion of the beam are measured at the vicinity of the bearings on the bridge pier.

SUMMARY

However, although the method described in Japanese Unexamined Patent Application Publication No. 2014-173313 allows one to estimate which bearing has a problem based on the vibrations in the end portion of the beam in the vicinity of the bearings on the bridge pier, the method does not make it possible to find the specific site where the problem exists in individual bearings or to evaluate the magnitude of the problem, for example.

Accordingly, the present disclosure provides a detection device and a detection method that make it possible to detect a bearing having a problem with high accuracy.

A detection device according to one aspect of the present disclosure includes: an acquirer that acquires a video of each of a plurality of bearings of a structure including the plurality of bearings; an extractor that extracts a dynamic feature corresponding to a plurality of degrees of freedom of each of the plurality of bearings based on the video; and an identifier that identifies, among the plurality of bearings, a bearing whose dynamic feature fails to match a dynamic feature of one or more other bearings of the plurality of bearings.

It is to be noted that general or specific embodiments of the above aspect may be implemented in the form of a system, a method, an integrated circuit, a computer program, or a computer readable recording medium, such as a recording disk, or through any desired combination of a system, a method, an integrated circuit, a computer program, and a recording medium. Examples of the computer readable recording medium include a nonvolatile recording medium, such as a compact disc-read only memory (CD-ROM).

Additional benefits and advantages of the one aspect of the present disclosure will become apparent from the specification and the drawings. The benefits and/or advantages may be individually obtained through the various embodiments and features disclosed in the specification and the drawings, and not all the embodiments and features are required in order to obtain one or more of such benefits and/or advantages.

The detection device and the detection method according to the present disclosure make it possible to detect a bearing having a problem with high accuracy.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 5 is a flowchart illustrating an example of an operation of the detection device according to Embodiment 1;

FIG. 6 illustrates an example of time-series data of the displacement of a plurality of bearings according to Embodiment 1;

Figure 1:
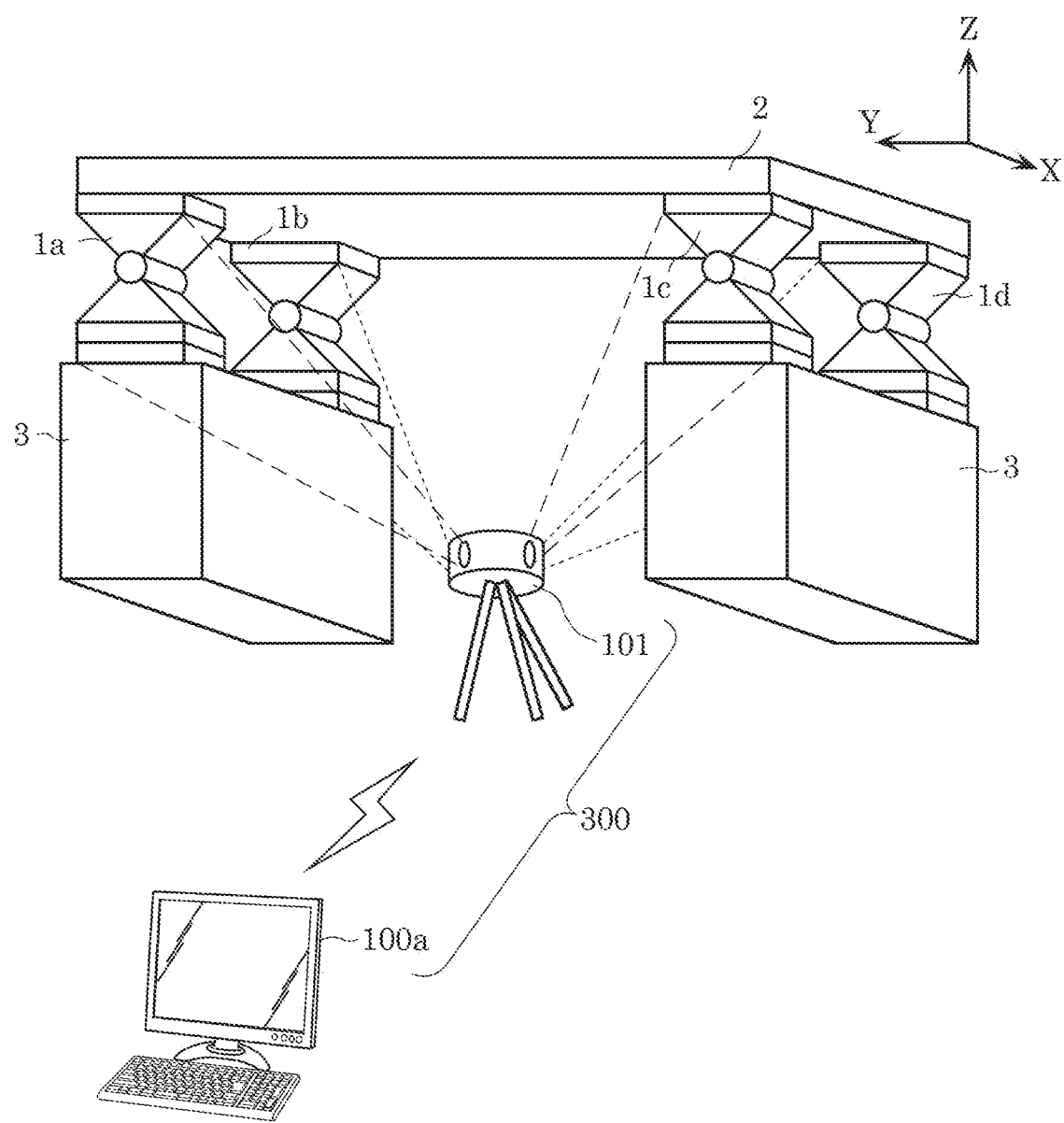
FIG. 1 is a schematic diagram illustrating an example of a configuration of a detection system according to Embodiment 1.

DETAILED DESCRIPTION OF THE EMBODIMENTS (Overview of the Present Disclosure)

A detection device according to one aspect of the present disclosure includes an acquirer, an extractor, and an identifier. The acquirer acquires a video of each of a plurality of bearings of a structure including the plurality of bearings. The extractor extracts a dynamic feature corresponding to a plurality of degrees of freedom of each of the plurality of bearings based on the video. The identifier identifies, among the plurality of bearings, a bearing whose dynamic feature fails to match the dynamic feature of one or more other bearings of the plurality of bearings.

With this detection device, any bearing, among the plurality of bearings, that moves in a relatively different manner can be identified appropriately as a bearing that is highly likely to be experiencing an anomaly based on the movement of each bearing corresponding to the plurality of degrees of freedom of each bearing. Therefore, the detection device according to the one aspect of the present disclosure makes it possible to identify a bearing having a problem with high accuracy.

For example, in the detection device according to the one aspect of the present disclosure, the dynamic feature of each of the plurality of bearings may be a displacement corresponding to the plurality of degrees of freedom.

This configuration makes it possible to determine whether each of the bearings is moving in a prescribed manner based on the displacement in each of the plurality of degrees of freedom of each of the bearings. In addition, the above configuration makes it possible to identify in which degree of freedom anomaly is present in the bearing that is not moving in the prescribed manner. Accordingly, the detection device according to the one aspect of the present disclosure can identify a bearing having a problem among the plurality of bearings with improved accuracy.

For example, in the detection device according to the one aspect of the present disclosure, the dynamic feature of each of the plurality of bearings may be indicated by a value composing a main component obtained in association with the plurality of degrees of freedom by performing a main component analysis of movements of the plurality of bearings.

With this configuration, characteristic displacements related to the movements of the bearings can be expressed in the physical quantities that are not linearly correlated to each other. Furthermore, a displacement can be expressed by a physical quantity from which a minor component, that is, a noise component is removed from the movement of each bearing, and thus the influence of an error and noise can be reduced when a bearing having a problem is identified. Accordingly, the detection device according to the one aspect of the present disclosure can identify a bearing having a problem among the plurality of bearings with improved accuracy.

For example, in the detection device according to the one aspect of the present disclosure, the bearing whose dynamic feature fails to match the dynamic feature of the one or more other bearings of the plurality of bearings may be a bearing whose dynamic feature is neither identical nor symmetric to the dynamic feature of the one or more other bearings of the plurality of bearings.

This makes it possible to identify a bearing having a problem based on the relative movements of the plurality of bearings. In other words, a bearing having a problem can be identified even when no data serving as a reference acquired in advance is present. Therefore, the detection device according to the one aspect of the present disclosure can identify a hearing having a problem even when there is no clear determination standard. Accordingly, the detection device according to the one aspect of the present disclosure can identify a bearing having a problem among the plurality of bearings in a simple manner.

For example, the detection device according to the one aspect of the present disclosure may further include an imager that captures synchronous videos of the plurality of bearings.

This configuration allows the detection device to identify, among the plurality of bearings, a bearing having a problem without acquiring any video from the outside.

For example, the detection device according to the one aspect of the present disclosure may further include a corrector that corrects the dynamic feature of each of the plurality of bearings in accordance with a distance from an imager that captures the video. The identifier may identify, among the plurality of bearings, the bearing whose dynamic feature fails to match the dynamic feature of the one or more other bearings of the plurality of bearings based on the dynamic feature corrected by the corrector.

This configuration makes it possible to calculate the dynamic feature of each of the plurality of bearings with higher accuracy. In addition, the use of the corrected dynamic feature makes it possible to identify a bearing having a problem with higher accuracy.

For example, in the detection device according to the one aspect of the present disclosure, the structure may be a bridge girder or a bridge.

This can reduce a load imposed on a worker working at an elevated location in order to inspect any problem in the bearings that displaceably support the bridge girder or the bridge.

For example, in the detection device according to the one aspect of the present disclosure, the video acquired by the acquirer may be a video captured while a load applied to the structure including the plurality of bearings is changing.

This configuration allows a sufficient displacement to be produced, and thus the accuracy of identifying the bearing whose dynamic feature fails to match the dynamic feature of the one or more other bearings of the plurality of bearings can be improved.

A detection method according to one aspect of the present disclosure includes an acquiring step of acquiring a video of each of a plurality of bearings of a structure including the plurality of bearings; an extracting step of extracting a dynamic feature corresponding to a plurality of degrees of freedom of each of the plurality of bearings based on the video; and an identifying step of identifying, among the plurality of bearings, a bearing whose dynamic feature fails to match a dynamic feature of one or more other bearings of the plurality of bearings.

With this detection method, any bearing, among the plurality of bearings, that moves in a relatively different manner can be identified appropriately as a bearing that is highly likely to be experiencing an anomaly based on the movement of each bearing corresponding to the plurality of degrees of freedom of each bearing. Therefore, the detection method according to the one aspect of the present disclosure makes it possible to identify a bearing having a problem with high accuracy.

It is to be noted that general or specific embodiments of the above aspects may be implemented in the form of a system, an apparatus, a method, an integrated circuit, a computer program, or a computer readable recording medium, such as a recording disk, or through any desired combination of a system, an apparatus, a method, an integrated circuit, a computer program, and a recording medium. Examples of the computer readable recording medium include a nonvolatile recording medium, such as a CD-ROM.

Hereinafter, a detection device and a detection method according to some embodiments of the present disclosure will be described in concrete terms with reference to the drawings.

The embodiments described below merely illustrate general or specific examples. The numerical values, the shapes, the constituent elements, the arrangement positions and the connection modes of the constituent elements, the steps (the processes), the orders of the steps, and so on illustrated in the following embodiments are examples and are not intended to limit the present disclosure. Among the constituent elements described in the following embodiments, any constituent element that is not included in the independent claims expressing the broadest concept is to be construed as an optional constituent element. The following description of the embodiments may include some expressions modified by "substantially", such as "substantially parallel" or "substantially orthogonal". For example, the expression "substantially parallel" means not only that some entities are perfectly parallel but also that some entities are practically parallel with some permitted difference of, for example, approximately several percentages. This explanation applies similarly to other expressions that include the modifier "substantially". Furthermore, the description of the following embodiments assumes that principal parts are the same or two elements have the same properties, for example. The drawings are schematic diagrams and do not necessarily provide the exact depictions. Furthermore, in the drawings, substantially identical constituent elements are given identical reference characters, and duplicate descriptions thereof may be omitted or simplified.

Embodiment 1

[Overview of Detection System]

First, an overview of a detection system according to the present embodiment will be provided in concrete terms with reference to FIG. 1. FIG. 1 is a schematic diagram illustrating an example of a configuration of detection system 300 according to the present embodiment.

Detection system 300 captures videos of a plurality of bearings 1a, 1b, 1c, and 1d (hereinafter, 1a to 1d) of structure 2 that includes the plurality of bearings 1a to 1d. Based on the obtained videos, detection system 300 extracts a dynamic feature corresponding to the degree of freedom of each of the plurality of bearings 1a to 1d and identifies a bearing whose dynamic feature fails to match the dynamic feature of one or more bearings of the plurality of bearings 1a to 1d.

Herein, structure 2 is a structure including a plurality of bearings, and examples of structure 2 include a bridge girder and a bridge. In the example described below, structure 2 is a bridge girder, and the plurality of bearings 1a to 1d are disposed on bridge piers 3 and displaceably support the bridge girder.

Figure 2:
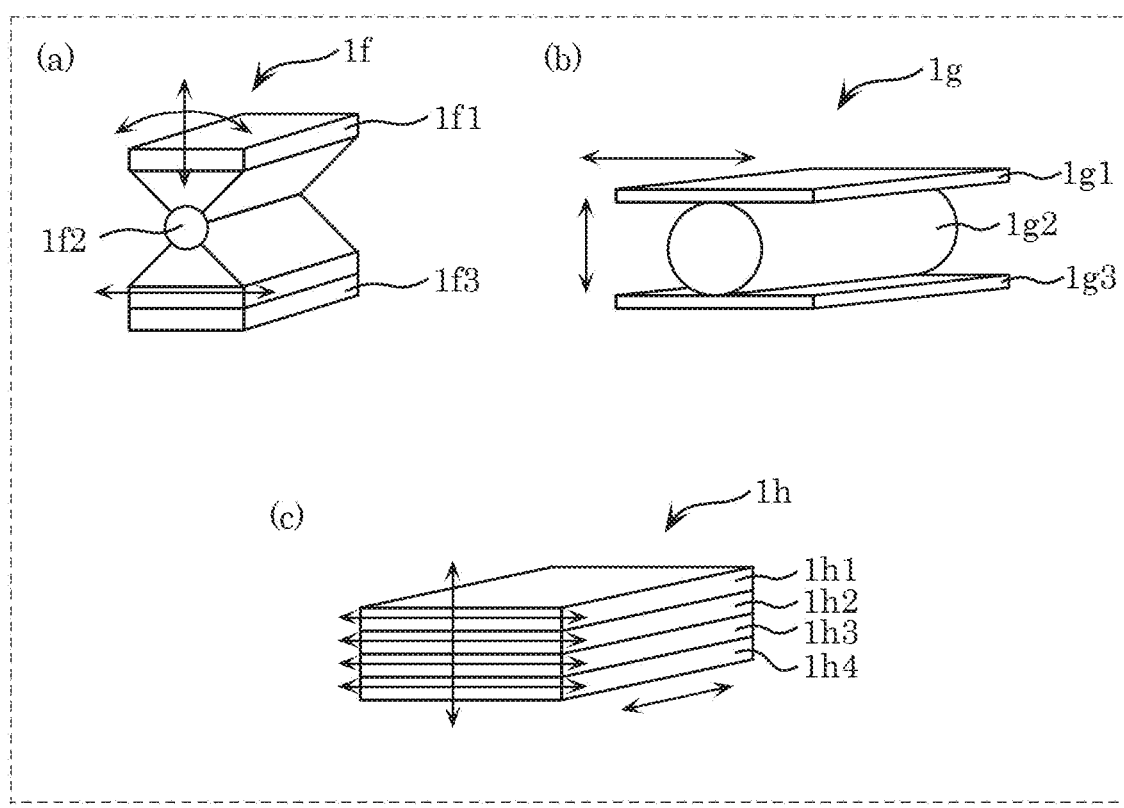
FIG. 2 is a schematic diagram illustrating specific examples of bearings.

First, prior to describing detection system 300, the degree of freedom and the dynamic feature will be described in concrete terms with reference to the drawings. FIG. 2 is a schematic diagram illustrating specific examples of the bearings.

The degree of freedom of a bearing corresponds to a movable direction of the bearing. To be more specific, the degree of freedom of a bearing corresponds to the number of movable directions of the bearing. For example, in a case where a bearing is movable in three directions, this bearing has three degrees of freedom. When a bearing has three degrees of freedom, this may also be phrased that the degree of freedom of the bearing is three or that the bearing has three degrees of freedom (or the degree of freedom of three). A bearing may be movable in a translation direction, that is, in a linear direction or movable in a rotary direction.

A plurality of degrees of freedom of a bearing differ depending on the types of bearings. FIG. 2 illustrates three types of bearings and a plurality of degrees of freedom of each of these bearings.

For example, bearing 1f illustrated in (a) in FIG. 2 is an example of a pin roller bearing. Bearing 1f has three degrees of freedom indicated by the respective arrows. To be more specific, pin roller 1f2 of bearing 1f can rotate in a specific direction with respect to a center axis of pin roller 1f2. In this example, pin roller 112 can rotate clockwise and counterclockwise with respect to the center axis of pin roller 1f2. Lower shoe 1f2 of bearing 1f can slide in the right and left direction with respect to the paper plane. Bearing 1f constituted by the combination of upper shoe 1f1, pin roller 1f2, and lower shoe 1f3 as a whole can move in the up and down direction with respect to the paper plane. Thus, bearing 1f has three degrees of freedom in total.

Meanwhile, bearing 1g illustrated in (b) in FIG. 2 is an example of a single roller bearing. Bearing 1g has two degrees of freedom indicated by the respective arrows. To be more specific, upper shoe 1g1 of bearing 1g can slide in the right and left direction with respect to the paper plane. Bearing 1g constituted by the combination of upper shoe 1g1, roller 1g2, and lower shoe 1g2 as a whole can move in the up and down direction with respect to the paper plane. Thus, bearing 1g has two degrees of freedom in total.

Bearing 1h illustrated in (c) in FIG. 2 is an example of a pad rubber bearing. Bearing 1h has six degrees of freedom indicated by the respective arrows. To be more specific, each of stacked rubber pads 1h1 to 1h4 of bearing 1h can slide in the right and left direction with respect to the paper plane. Bearing 1h constituted by the combination of rubber pads 1h1 to 1h4 as a whole can move in the up and down direction with respect to the direction in which the rubber pads are stacked. Bearing 1h as a whole can slide back and forth in the depthwise direction. Thus, bearing 1h has six degrees of freedom. In this example, one degree of freedom is defined in the depthwise direction for bearing 1h as a whole. In a case where one degree of freedom in the depthwise direction is defined for each of the rubber pads, bearing 1h has nine degrees of freedom.

Next, the dynamic feature will be described. A dynamic feature is a feature related to movement. A dynamic feature corresponding to a plurality of degrees of freedom of a bearing is a feature related to the movement of the bearing produced in association with the plurality of degrees of freedom of the bearing. A dynamic feature may be a displacement corresponding to a plurality of degrees of freedom or may be indicated by values composing main components obtained for a plurality of degrees of freedom by performing a main component analysis of the movements of a plurality of bearings. In this example, a displacement corresponding to a plurality of degrees of freedom of a bearing is a displacement of each portion of the bearing produced in association with the plurality of degrees of freedom.

Figure 3:
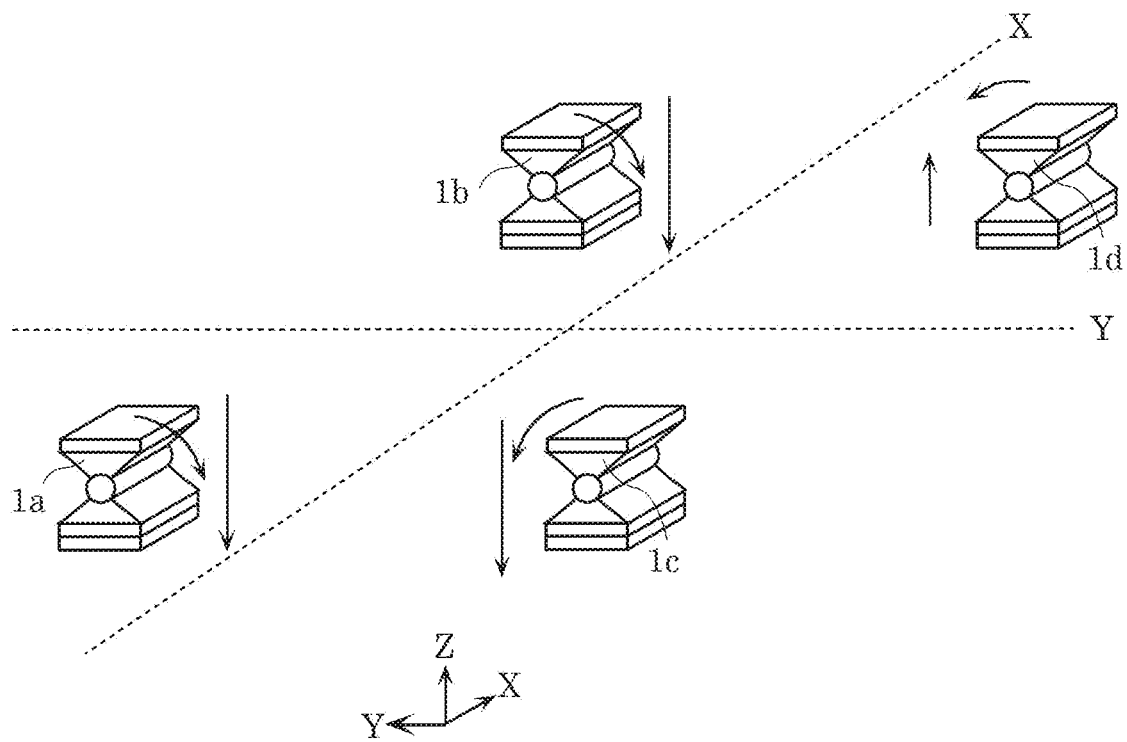
FIG. 3 illustrates examples of dynamic features of a plurality of bearings observed when a bearing load is applied to the structure illustrated in FIG. 1.

With a case where a dynamic feature is a displacement corresponding to a plurality of degrees of freedom serving as an example, the dynamic feature of each of a plurality of bearings will be described in more concrete terms with reference to FIG. 3. FIG. 3 illustrates examples of the dynamic features of the plurality of bearings 1a to 1d observed when a bearing load is applied to structure 2 illustrated in FIG. 1.

The plurality of bearings 1a to 1d each have three degrees of freedom, as described with reference to (a) in FIG. 2. The dynamic feature of each of the plurality of bearings 1a to 1d is a displacement corresponding to the three degrees of freedom. FIG. 3 illustrates the dynamic feature of each of the plurality of bearings 1a to 1d observed when a bearing load is applied to structure 2 along the Y-axis. As illustrated in FIG. 3, bearings 1a to 1d each undergo a displacement corresponding to the degree of freedom that allows the bearing to slide in the Y-axis direction. In addition, bearings 1a to 1d each undergo a displacement corresponding to the degree of freedom that allows the bearing to rotate about the axis of rotation parallel to the X-axis as well as a displacement corresponding to the degree of freedom that allows the bearing to move from the positive side to the negative side in the Z-axis direction.

Next, a specific example of a bearing, among a plurality of bearings, whose dynamic feature matches the dynamic features of the rest of the bearings will be described.

When it is said that the dynamic feature of a given bearing matches the dynamic features of the rest of the bearings, this means that, when a certain bearing load is applied to structure 2, the dynamic feature corresponding to the plurality of degrees of freedom of the given bearing is identical or symmetric to the dynamic features corresponding of the plurality of degrees of freedom of the rest of the bearings.

For example, as illustrated in FIG. 3, when a bearing load is applied to structure 2 along the X-axis, bearing 1a and bearing 1c that are disposed symmetrically with respect to the X-axis each undergo a displacement corresponding to the degree of freedom that allows the bearing to rotate about the axis of rotation of the bearing (in this example, the axis parallel to the X-axis) as well as a displacement corresponding to the degree of freedom that allows the bearing to move linearly from the positive side to the negative side in the Z-axis direction. At this point, bearing 1a undergoes a displacement associated with the degree of freedom that allows bearing 1a to rotate clockwise about the axis of rotation in the paper plane, and bearing 1c undergoes a displacement associated with the degree of freedom that allows bearing 1c to rotate counterclockwise about the axis of rotation in the paper plane. These bearings rotate about the axis of rotation so as to tilt with respect to the X-axis direction. Furthermore, these bearings both move linearly from the positive side to the negative side in the Z-axis direction. Therefore, the dynamic feature of bearing 1a corresponding to its plurality of degrees of freedom and the dynamic feature of bearing 1c corresponding to its plurality of degrees of freedom are symmetric to each other.

Meanwhile, bearing 1a and bearing 1b that are disposed symmetrically with respect to the Y-axis each undergo a displacement corresponding to the degree of freedom that allows the bearing to rotate about the axis of rotation of the bearing (in this example, the axis parallel to the Y-axis) as well as a displacement corresponding to the degree of freedom that allows the bearing to move linearly from the positive side to the negative side in the Z-axis direction. At this point, bearing 1a and bearing 1b both undergo a displacement associated with the degree of freedom that allows bearing 1a and bearing 1b to rotate clockwise about the axis of rotation in the paper plane. Therefore, the dynamic feature of bearing 1a corresponding to its plurality of degrees of freedom and the dynamic feature of bearing 1b corresponding to its plurality of degrees of freedom are identical to each other.

Accordingly, the dynamic features of bearing 1a, bearing 1b, and bearing 1c match each other.

Next, a specific example of a bearing, among a plurality of bearings, whose dynamic feature fails to match the dynamic features of the rest of the bearings will be described.

When it is said that the dynamic feature of a given bearing fails to match the dynamic features of the rest of the bearings, this means that the dynamic feature corresponding to the plurality of degrees of freedom of the given bearing is neither identical nor symmetric, to the dynamic features corresponding to the plurality of degrees of freedom of the rest of the bearings.

For example, as illustrated in FIG. 3, when a bearing load is applied to structure 2 along the X-axis, bearing 1b and bearing 1d that are disposed symmetrically with respect to the X-axis each undergo a displacement corresponding to the degree of freedom that allows the bearing to rotate about the axis of rotation of bearing 1b or bearing 1d, and the displacements of bearing 1b and bearing 1d are symmetric to each other. In other words, bearing 1b and bearing 1d each rotate so as to tilt with respect to the X-axis direction. However, with regard to the degree of freedom that allows bearing 1b or bearing 1d to move linearly in the Z-axis direction, bearing 1b moves linearly from the positive side to the negative side in the Z-axis direction, and bearing 1d moves linearly from the negative side to the positive side in the Z-axis direction. Therefore, the dynamic feature of bearing 1b corresponding to its plurality of degrees of freedom and the dynamic feature of bearing 1d corresponding to its plurality of degrees of freedom are not symmetric to each other.

Meanwhile, bearing 1c and bearing 1d that are disposed symmetrically with respect to the Y-axis each undergo a displacement corresponding to the degree of freedom that allows the bearing to rotate about the axis of rotation of bearing 1c or bearing 1d, and the displacements of bearing 1c and bearing 1d are identical to each other. In other words, bearing 1c and bearing 1d each rotate so as to tilt with respect to the X-axis direction. However, with regard to the degree of freedom that allows bearing 1c or bearing 1d to move linearly in the Z-axis direction, bearing 1c moves linearly from the positive side to the negative side in the Z-axis direction, and bearing 1d moves linearly from the negative side to the positive side in the Z-axis direction. Therefore, the dynamic feature of bearing 1c corresponding to its plurality of degrees of freedom and the dynamic feature of bearing 1d corresponding to its plurality of degrees of freedom are not identical to each other.

Accordingly, in the case of the example illustrated in FIG. 3, the dynamic feature of bearing 1d fails to match the dynamic features of remaining bearings 1a, 1b, and 1c.

As described above, detection system 300 identifies, among the plurality of bearings 1a to 1d of structure 2 including a plurality of bearings, a bearing (bearing 1d in the case illustrated in FIG. 3) whose dynamic feature fails to match the dynamic features of the rest of the bearings and detect the bearing having a problem.

Referring back to FIG. 1, each component; of detection system 300 will be described. Detection system 300 includes image capturing device 101 and detection device 100a.

Image capturing device 101 is, for example, a digital video camera or a digital still camera that includes an image sensor. Image capturing device 101 captures synchronous videos of the plurality of bearings 1a to 1d, for example.

As illustrated in FIG. 1, image capturing device 101 is disposed between two adjacent bridge piers 3, for example. In a case where one image capturing device 101 is disposed between two adjacent bridge piers 3, this image capturing device 101 may be an image capturing device capable of shooting omnidirectionally or an image capturing device capable of shooting only in four directions, for example, including the directions of the plurality of bearings 1a to 1d. The number of image capturing device 101 to be disposed is not limited to one, and two or more image capturing devices 101 may be disposed. For example, when two or more image capturing devices 101 are disposed between two adjacent bridge piers 3, each image capturing device 101 may capture synchronous videos of at least two adjacent bearings.

Detection device 100a is, for example, a computer and includes a processor (not illustrated) and a memory (not illustrated) that stores a software program or an instruction. The processor executes the software program. Thus, detection device 100a implements a plurality of functions described later. Herein, detection device 100a may be constituted by a dedicated electronic circuit (not illustrated). In this case, the plurality of functions described later may be implemented by separate electronic circuits or by a single integrated electronic circuit.

Detection device 100a and image capturing device 101 are communicably connected, for example. Based on the video of each of a plurality of bearings captured by image capturing device 101, detection device 100a extracts the dynamic feature corresponding to a plurality of degrees of freedom of each of the plurality of bearings and identifies, among the plurality of bearings, any bearing whose dynamic feature fails to match the dynamic features of the rest of the bearings.

Configuration of Detection Device According to Embodiment 1

Figure 4:
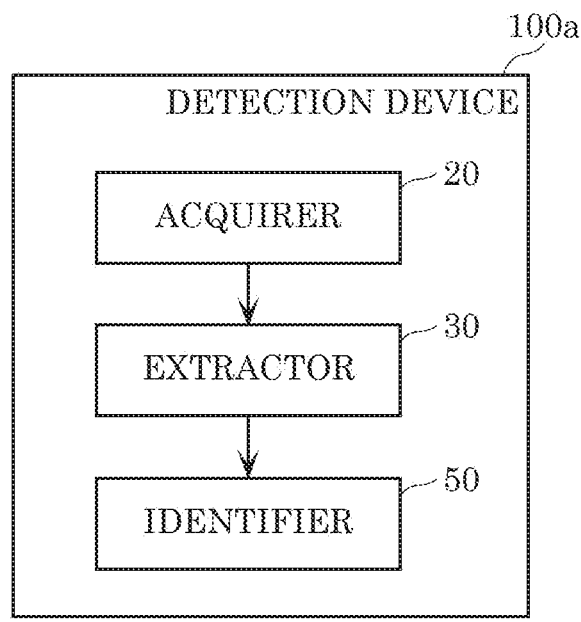
FIG. 4 is a block diagram illustrating an example of a functional configuration of a detection device according to Embodiment 1.

Next, a functional configuration of detection device 100a according to the present embodiment will be described. FIG. 4 is a block diagram illustrating an example of a functional configuration of detection device 100a according to the present embodiment.

As illustrated in FIG. 4, detection device 100a includes acquirer 20, extractor 30, and identifier 50.

Acquirer 20 acquires a video of each of a plurality of bearings of a structure including the plurality of bearings. From the viewpoint, of improving the accuracy of identifying a bearing whose dynamic feature fails to match the dynamic features of the rest of the bearings, the aforementioned video may include a video captured while a load is being applied to the structure and at least one of a video captured before the load is applied to the structure and when no load is yet being applied to the structure or a video captured after the load was applied to the structure and when the load is no longer being applied to the structure. In other words, the video acquired by acquirer 20 may be a video captured while the load applied to the structure including the plurality of bearings is changing. For example, in a case where structure 2 is a bridge girder, the video captured by acquirer 20 is a video captured while a vehicle, such as a train or a car, is traveling along the bridge girder. The video acquired by acquirer 20 is a moving image in which synchronous images of all of the plurality of bearings of structure 2 are captured.

For example, acquirer 20 acquires a plurality of videos from image capturing device 101 through wireless communication. In another example, acquirer 20 may acquire a plurality of videos from image capturing device 101 via a removable memory, such as a Universal Serial Bus (USB) memory.

Extractor 30 extracts the dynamic feature corresponding to the degrees of freedom of each of the plurality of bearings based on the plurality of videos acquired by acquirer 20. Specifically, extractor 30 may extract the displacement corresponding to the plurality of degrees of freedom of each of the plurality of bearings based on the plurality of videos or may extract values composing main components corresponding to the plurality of degrees of freedom by performing a main component analysis of the movements of the plurality of bearings.

In a case where a dynamic feature is a displacement corresponding to a plurality of degrees of freedom, extractor 30 extracts a displacement corresponding to a set of degrees of freedom of each of the plurality of bearings based on the acquired videos. The displacement may be extracted through, for example but not limited to, a correlation technique, such as a block matching technique, a normalized cross correlation technique, or a phase correlation technique, or a sampling moire technique, a feature point extracting technique (e.g., edge extraction), or a laser speckle correlation technique. The accuracy of extracting the displacement may be to the pixel unit or to the sub-pixel unit. The displacement in this example may be a displacement in the video.

Meanwhile, in a case where a dynamic feature is indicated by values composing main components obtained by performing a main component analysis of the movements of the plurality of bearings, extractor 30 performs the main component analysis on the plurality of displacements corresponding to the plurality of degrees of freedom. Specifically, extractor 30 performs the main component analysis on k displacements corresponding to k degrees of freedom of the plurality of bearings through the following procedures. First, extractor 30 extracts u(t) indicating the k displacements at time t through any of the aforementioned methods. For example, u(t) indicating the k displacements produced at time t is expressed as u(t)=$c_1 \ldots c_k$, t) with the use of $c_i$(i=1 to k) indicating the respective displacements. Then, extractor 30 obtains main component $e_1$ (i=1 to n, n is the number of the main components) for u(t) held at a plurality of times. Then, extractor 30 stores m (m≤n) main components among the extracted n main components into a storage (not illustrated). Number m of the main components to be stored may be specified from one with a higher eigenvalue or may be set with the use of the cumulative contribution ratio, or components of a preset eigenvalue level may be selected. The main components can be calculated through a typical technique such as diagonalization of covariance matrix. Extractor 30 stores the calculated in main components into the storage. Each main component is expressed as a motion vector, which is a vector expressing a motion, for example. For example, the dynamic feature of a given bearing may be indicated by a plurality of element values, among a plurality of element values composing the main components, that correspond to the plurality of degrees of freedom of the given bearing.

Identifier 50 identifies, among the plurality of bearings, a bearing whose dynamic feature fails to match the dynamic features of the rest of the bearings based on the dynamic features corresponding to the plurality of degrees of freedom of each bearing extracted by extractor 30. In other words, identifier 50 identifies, among the plurality of bearings, any bearing that moves differently from the rest of the bearings.

For example, identifier 50 identifies a bearing having a problem based on a statistical index. For example, identifier 50 identifies a bearing having a problem based on a representative value of the displacements corresponding to the plurality of degrees of freedom of the plurality of bearings (hereinafter, simply referred to as the representative value) and the displacement corresponding to the plurality of degrees of freedom of each of the plurality of bearings (hereinafter, referred to as the displacement of each bearing). For example, identifier 50 may identify a bearing having a problem based on the difference between the displacement of each bearing and the representative value. Identifier 50 may identify, among the plurality of bearings, a bearing in which the displacement of each bearing differs from the representative value by a predetermined value or more as the bearing having a problem.

The predetermined value may be a constant multiple of a standard deviation, for example. For example, identifier 50 may identify a bearing in which the displacement of each bearing differs from the representative value by a constant multiple or more of the standard deviation as the bearing having a problem. The representative value may be a mean value, a median value, or a robust estimated value of the displacements of the plurality of bearings. The robust estimated value includes a random sample consensus (RANSAC) estimated value and an M estimated value. The RANSAC estimated value is a mean value or a median value calculated from the displacement of each bearing from which an influence of any outlier has been removed from the displacement of each bearing through RANSAC estimation. Identifier 50 determines the representative value by calculating a mean value or a median value from the displacement of each bearing. Herein, the representative value of the displacements illustrated in FIGS. 6 and 7 described later may be a mean value, a median value, or a RANSAC estimated value. Any bearing whose dynamic feature fails to match the dynamic features of the rest of the bearings, that is, any bearing in which a displacement different from the displacements in the rest of the bearings is occurring is identified by detecting a deviation from the representative value described above.

A displacement corresponding to a plurality of degrees of freedom may be a representative displacement among the plurality of displacements corresponding to the plurality of degrees of freedom or may be each of the plurality of displacements corresponding to the plurality of degrees of freedom.

Operation of Detection Device According to Embodiment 1

Next, with reference to FIGS. 5 to 7, an operation of detection device 100a will be described. FIG. 5 is a flowchart illustrating an example of an operation of detection device 100a according to Embodiment 1. An operation of detection system 300 includes an image capturing step in which image capturing device 101 captures a video of each of the plurality of bearings, and this image capturing step is performed before acquiring step S20 indicated in FIG. 5. In the image capturing step, a video is captured so as to include a period in which a load is applied to structure 2, for example. In this case, videos of the plurality of bearings may be captured synchronously.

As illustrated in FIG. 5, acquirer 20 acquires a video of each of the plurality of bearings of the structure including the plurality of bearings (acquiring step S20). Detection device 100a may acquire videos successively from image capturing device 101 or may acquire a video shot continuously for a predetermined duration. Detection device 100a may acquire the video of each of the plurality of bearings from image capturing device 101 after image capturing device 101 has finished shooting each of the plurality of bearings.

Next, extractor 30 extracts the dynamic feature corresponding to the plurality of degrees of freedom of each of the plurality of bearings based on the video acquired in acquiring step S20 (extracting step S30). For example, in a case where the dynamic feature is the displacement corresponding to the plurality of degrees of freedom of each of the plurality of bearings, extractor 30 extracts a displacement for a set, of degrees of freedom of each bearing. The method of extracting a displacement has been described above, and thus description thereof will be omitted here.

Next, identifier 50 identifies, among the plurality of bearings, a bearing whose dynamic feature fails to match the dynamic features of the rest of the bearings (identifying step S50). Identifier 50 may extract, among the displacements corresponding to the plurality of degrees of freedom of each bearing extracted by extractor 30, a displacement corresponding to a specific degree of freedom and may compare the time-series data of this displacement. For example, the time-series data of this displacement may be graphed and compared. FIG. 6 illustrates an example of the time-series data of the displacements of the plurality of bearings 1a to 1d according to Embodiment 1.

FIG. 6 illustrates the time-series data of a displacement corresponding to a specific degree of freedom (hereinafter, referred to as the displacement in the specific degree of freedom), among the displacements corresponding to the plurality of degrees of freedom of each of the plurality of bearings 1a to 1d illustrated in FIGS. 1 and 3. The displacement in the specific degree of freedom is a displacement in a degree of freedom, among the plurality of degrees of freedom of the plurality of bearings, that differs from the other degrees of freedom of the other bearings in terms of the direction and the magnitude of the displacement. In other words, the displacement illustrated in FIG. 6 is the displacement in the degree of freedom, among the three degrees of freedom of each of the plurality of bearings 1a to 1d illustrated in FIG. 3, that allows the bearing to move linearly in the Z-axis direction.

FIG. 6 illustrates the displacement in the degree of freedom that allows each of the plurality of bearings 1a to 1d to move linearly in the Z-axis direction, that is, in the direction perpendicular to the ground surface while train 200 is passing along the bridge girder, for example. When train 200 approaches the bridge girder, a bearing load associated with train 200 is applied to the plurality of bearings 1a to 1d, and the plurality of bearings 1a to 1d sink in the negative direction along the Z-axis. The graph shows that bearing 1a, bearing 1b, and bearing 1c undergo a substantially identical displacement. However, bearing 1d is displaced in the positive direction along the Z-axis while the displacement in the specific degree of freedom of each of the other bearings is in the negative direction along the Z-axis. In other words, the graph shows that bearing 1d behaves differently from the rest of the bearings in terms of their displacements.

Figure 7:
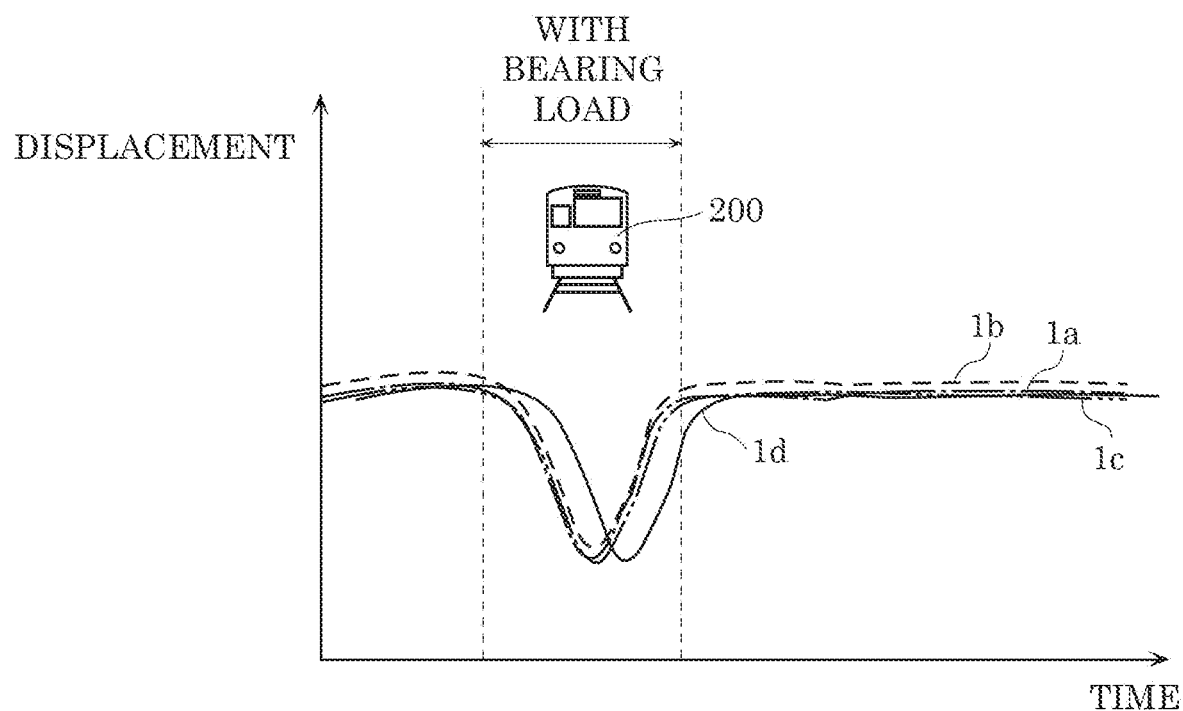
FIG. 7 illustrates another example of time-series data of the displacement of a plurality of bearings according to Embodiment 1.

Meanwhile, FIG. 7 illustrates another example of the time-series data of the displacements of the plurality of bearings 1a to 1d according to Embodiment 1. As with the displacement illustrated in FIG. 6, the displacement illustrated in FIG. 7 is a displacement in the degree of freedom, among the three degrees of freedom of each of the plurality of bearings 1a to 1d, that allows the bearing to move linearly in the Z-axis direction.

When train 200 approaches the bridge girder, a bearing load associated with train 200 is applied to the plurality of bearings 1a to 1d, and the plurality of bearings 1a to 1d sink in the negative direction along the Z-axis. The graph illustrated in FIG. 7 shows that bearing 1a, bearing 1b, and bearing 1c undergo a substantially identical displacement. However, bearing 1d undergoes a substantially identical displacement that differs in phase from the displacements of the rest of the bearings. In other words, the graph shows that bearing 1d behaves differently from the rest of the bearings in terms of their displacements.

In the example described above, the dynamic feature corresponding to the plurality of degrees of freedom of each of the plurality of bearings is a displacement corresponding to the plurality of degrees of freedom. Alternatively, the dynamic feature of each of the plurality of bearings may be indicated by values composing main components obtained so as to correspond to the plurality of degrees of freedom by performing a main component analysis of a plurality of movements. Specifically, a main component analysis may be performed in accordance with the movement of each of the plurality of bearings, and the difference in the level of influence of each bearing in the main component obtained so as to correspond to the plurality of degrees of freedom may be compared among the bearings.

As described above, identifier 50 identifies a bearing whose dynamic feature fails to match the dynamic features of the rest of the bearings based on the dynamic features corresponding to the plurality of degrees of freedom of the plurality of bearings.

Herein, the process in step S50 does not necessarily have to be performed after the process in step S30. The process in step S50 may be performed in parallel with the process in step S30, for example.

Advantageous Effects and Others of Embodiment 1

As described above, detection device 100a according to Embodiment 1 includes an acquirer that acquires a video of each of a plurality of bearings of a structure including the plurality of bearings, an extractor that extracts a dynamic feature corresponding to a plurality of degrees of freedom of each of the plurality of bearings based on the video, and an identifier that identifies, among the plurality of bearings, a bearing whose dynamic feature fails to match a dynamic features of one or more other bearings of the plurality of bearings.

A detection method according to Embodiment 1 includes acquiring step S20 of acquiring a video of each of a plurality of bearings of a structure including the plurality of bearings, extracting step S30 of extracting a dynamic feature corresponding to a plurality of degrees of freedom of each of the plurality of bearings based on the video, and identifying step S50 of identifying, among the plurality of bearings, a bearing whose dynamic feature fails to match a dynamic features of one or more other bearings of the plurality of bearings.

With the above detection device and detection method, any bearing, among the plurality of bearings, that moves in a relatively different manner can be identified appropriately as a bearing that is highly likely to be experiencing an anomaly based on the movement of each bearing corresponding to the plurality of degrees of freedom of each bearing. Accordingly, a bearing having a problem can be identified with high accuracy.

For example, in the detection device according to Embodiment 1, the dynamic feature of each of the plurality of bearings may be a displacement corresponding to the plurality of degrees of freedom.

This configuration makes it possible to determine whether each of the bearings is moving in a prescribed manner based on the displacement in each of the plurality of degrees of freedom of each of the bearings. In addition, the above configuration makes it possible to identify in which degree of freedom an anomaly is present in the bearing that is not moving in the prescribed manner. Accordingly, the detection device can identify a bearing having a problem among the plurality of bearings with improved accuracy.

For example, in the detection device according to Embodiment 1, the dynamic feature of each of the plurality of bearings may be indicated by a value composing a main component obtained in association with the plurality of degrees of freedom by performing a main component analysis of the movements of the plurality of bearings.

With this configuration, characteristic displacements related to the movements of the bearings can be expressed in the physical quantities that are not linearly correlated to each other. Furthermore, a displacement can be expressed by a physical quantity from which a minor component, that is, a noise component is removed from the movement of each bearing, and thus the influence of an error and noise can be reduced when a bearing having a problem is identified. Accordingly, the detection device can identify a bearing having a problem among the plurality of bearings with improved accuracy.

For example, in the detection device according to Embodiment 1, the bearing whose dynamic feature fails to match the dynamic feature of the one or more other bearings of the plurality of bearings is a bearing whose dynamic feature is neither identical nor symmetric to the dynamic feature of the one or more other bearings of the plurality of bearings. For example, it may be determined that the dynamic feature of a given bearing fails to match the dynamic features of the other bearings when the sign of the dynamic feature of the given bearing differs from the sign of the dynamic features of the other bearings or when a difference between the dynamic features is at a predetermined value or higher or a ratio of the dynamic features is at a predetermined value or higher.

This makes it possible to identify a bearing having a problem based on the relative movements of the plurality of bearings. In other words, a bearing having a problem can be identified even when no data serving as a reference acquired in advance is present. Therefore, the detection device according to one aspect of the present disclosure can identify a bearing having a problem even when there is no clear determination standard. Accordingly, the detection device can identify a bearing having a problem among the plurality of bearings in a simple manner.

For example, in the detection device according to Embodiment 1, the structure may be a bridge girder or a bridge.

This can reduce a load imposed on a worker working at an elevated location in order to inspect any problem in the bearings that displaceably support the bridge girder or the bridge.

For example, in the detection device according to Embodiment 1, the video acquired by the acquirer may be a video captured while a load applied to the structure including the plurality of bearings is changing.

This configuration allows a sufficient displacement to be produced, and thus the accuracy of identifying the bearing whose dynamic feature fails to match the dynamic feature of the one or more other bearings of the plurality of bearings can be improved.

As described above, images of the plurality of bearings 1a to 1d supporting one structure 2 may be captured, or images of bearing 1a and bearing 1b supported by one bridge pier 3 or images of bearing 1c and bearing 1d supported by one bridge pier 3 may be captured. Then, the consistency in the behaviors among or between the bearings observed when the bearings are operating normally is expected to be obtained. For example, the symmetry or the identicalness of the behaviors among or between the corresponding bearings is expected to be obtained. Therefore, the advantageous effects to be provided by the present disclosure can be obtained more easily in particular.

Figure 8:
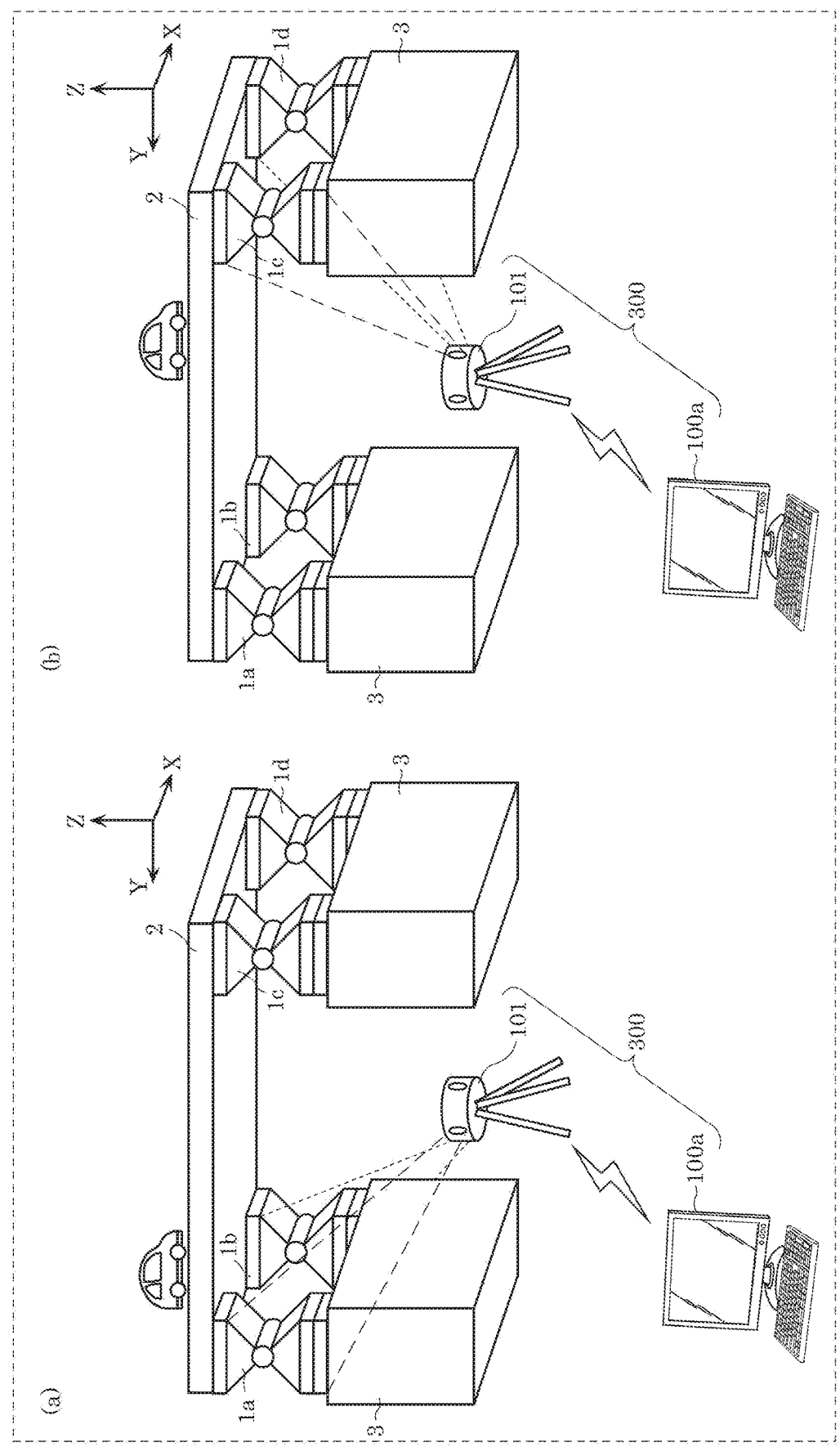
FIG. 8 is a schematic diagram illustrating detection timings of the detection system according to Embodiment 1.

In the present embodiment, the videos of the plurality of bearings 1a to 1d may be captured synchronously. As illustrated in (a) and (b) in FIG. 8, videos captured when a bearing load is applied to the plurality of bearings 1a to 1d as a vehicle or a train passes through the position of symmetry of structure 2 may be combined. With this configuration as well, a bearing having a problem can be detected with high accuracy by comparing the symmetry in the behaviors of the corresponding bearings, as in the case of Embodiment 1 described above.

Figure 9:
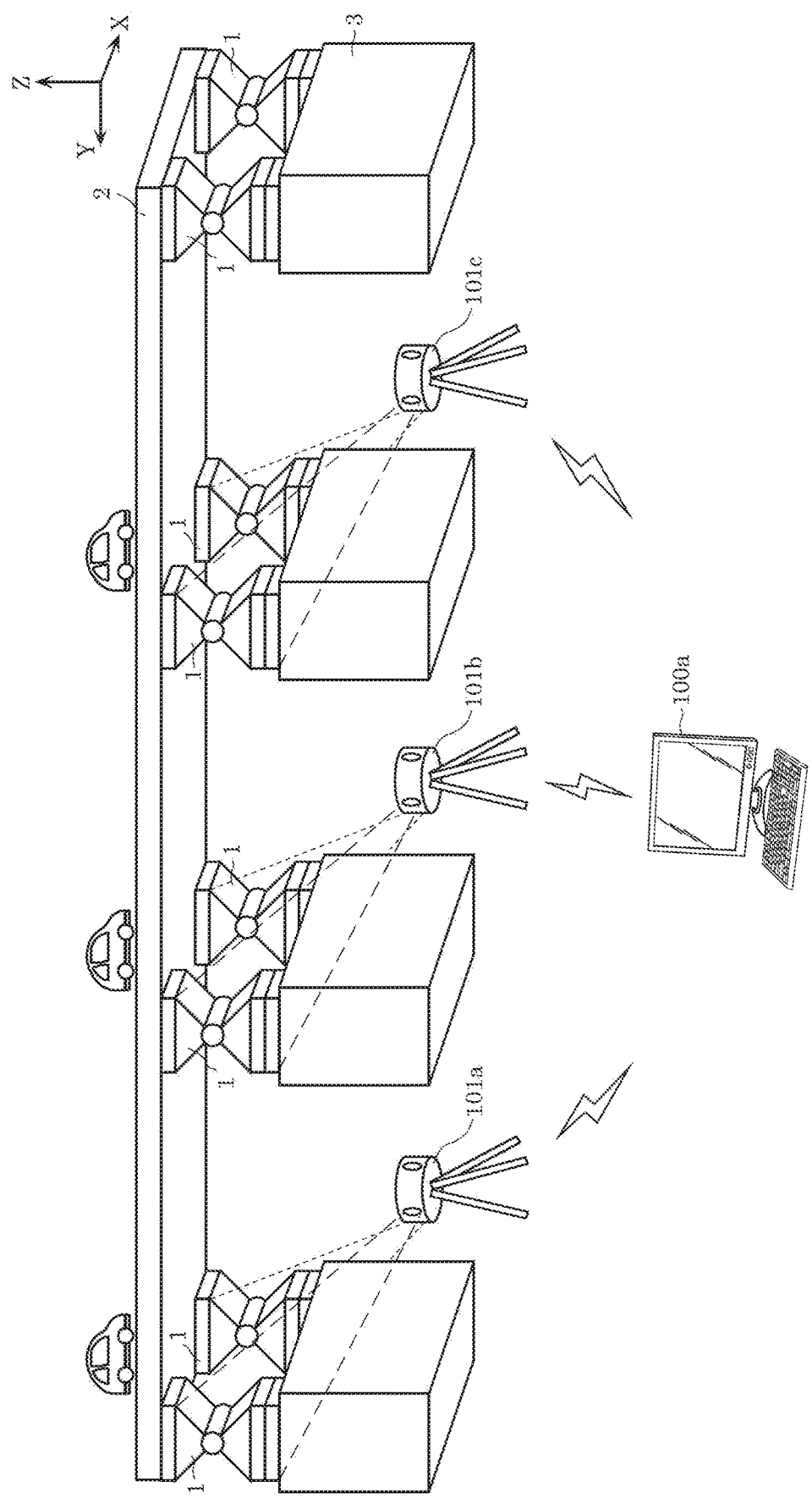
FIG. 9 is a schematic diagram illustrating another example of a configuration of a detection system according to Embodiment 1.

Furthermore, as illustrated in FIG. 9, in a bridge like a multi-arch bridge in which an identical structure is repeated, videos captured when an identical bearing load (e.g., a passing vehicle, train, etc.) is applied to a plurality of bearings 1 as the vehicle or the train passes over the plurality of bearings 1 installed at relatively identical positions with different spans may be combined. With this configuration as well, a bearing having a problem can be detected with high accuracy by comparing the identicalness in the behaviors of the corresponding bearings as in the case of Embodiment 1 described above.

Embodiment 2

Configuration of Detection Device According to Embodiment 2

Figure 10:
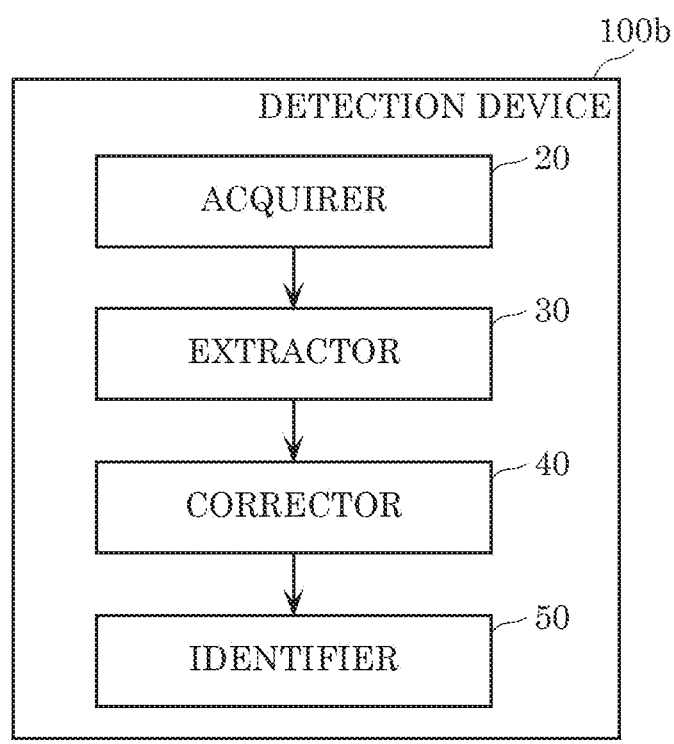
FIG. 10 is a block diagram illustrating an example of a configuration of a detection device according to Embodiment 2.

Next, with reference to FIG. 10, a detection device according to Embodiment 2 will be described. FIG. 10 is a block diagram illustrating an example of a functional configuration of detection device 100b according to Embodiment 2. Detection device 100b according to Embodiment 2 differs from detection device 100a according to Embodiment 1 in that detection device 100b further includes corrector 40 and in that identifier 50 uses dynamic features corrected by corrector 40. Hereinafter, detection device 100b according to Embodiment 2 will be described with the description centered on the differences from Embodiment 1.

As illustrated in FIG. 10, detection device 100b includes corrector 40 in addition to acquirer 20, extractor 30, and identifier 50. Corrector 40 corrects the dynamic feature of each of the plurality of bearings in accordance with the distance from an imager, or image capturing device 101 (see FIG. 1) in this example, that captures the video.

For example, in a case where the ratio between the displacement in a captured image and the displacement in a real space varies depending on the difference in the real space distance from the imaging position of image capturing device 101 to each bearing, corrector 40 performs a scale correction so as to make the ratio constant, as necessary. This scale correction may be performed on the extracted displacement or on the captured video.

Identifier 50 identifies, among the plurality of bearings, a bearing whose dynamic feature fails to match the dynamic features of the rest of the bearings based on the dynamic feature (the displacement in this example) corrected by corrector 40.

Operation of Detection Device According to Embodiment 2

Figure 11:
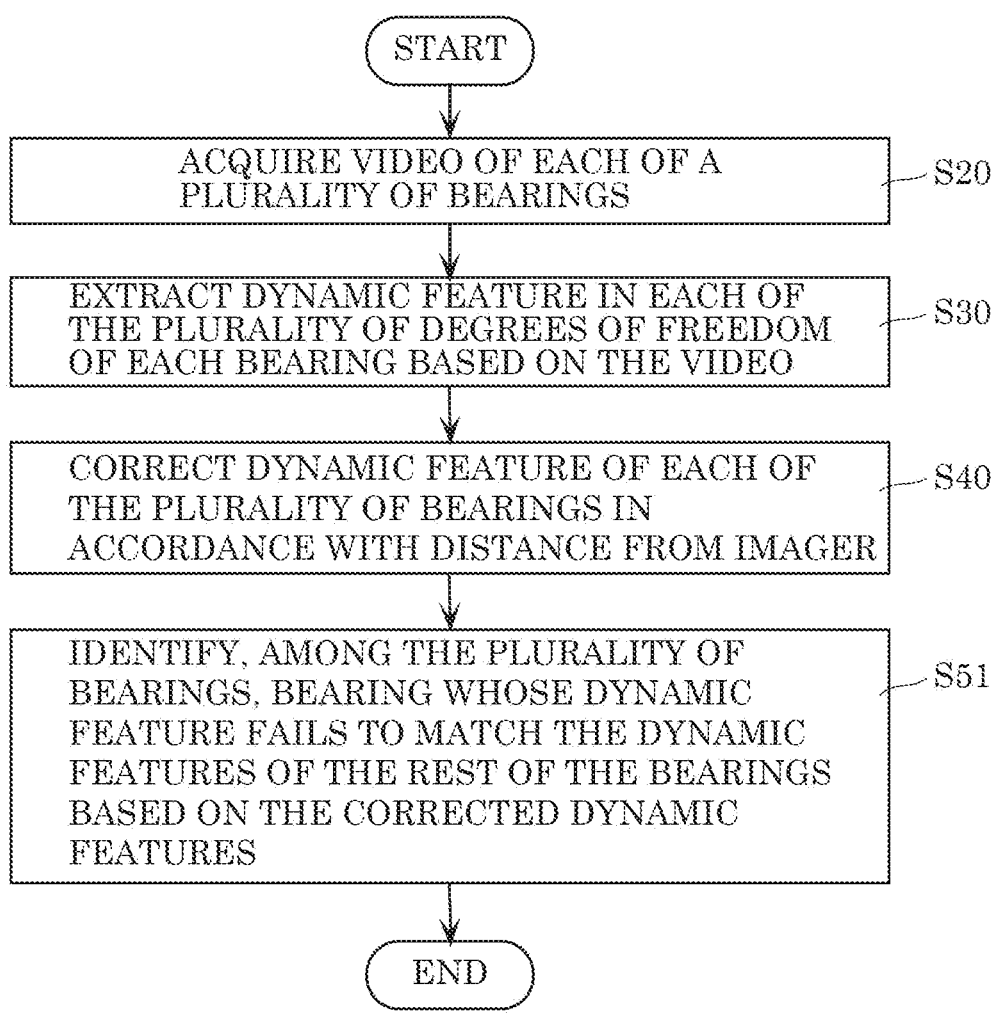
FIG. 11 is a flowchart illustrating an example of an operation of the detection device according to Embodiment 2.

Next, with reference to FIG. 11, an operation of detection device 100b will be described. FIG. 11 is a flowchart illustrating an example of an operation of detection device 100b according to Embodiment 2. As in Embodiment 1, an operation of the detection system includes an image capturing step in which image capturing device 101 captures a video of each of the plurality of bearings, and this image capturing step is performed before step S20 indicated in FIG. 11. In the image capturing step, a video is captured so as to include a period in which a load is applied to structure 2 (see FIG. 1) for example. As in Embodiment 1, in Embodiment 2 as well, videos of the plurality of bearings may be captured synchronously in the image capturing step.

As illustrated in FIG. 11, acquirer 20 acquires a video of each of the plurality of bearings of the structure including the plurality of bearings (acquiring step S20). Detection device 100b may acquire videos successively from image capturing device 101 (see FIG. 1) or may acquire a video shot continuously for a predetermined duration. Detection device 1001) may acquire a video of each of the plurality of bearings from image capturing device 101 after image capturing device 101 has finished shooting each of the plurality of bearings.

Next extractor 30 extracts the dynamic feature corresponding to the plurality of degrees of freedom of each of the plurality of bearings based on the video acquired in acquiring step S20 (extracting step S30). For example, extractor 30 detects each bearing from the acquired video of each of the plurality of bearings with the use of an existing image recognition technique and calculates the coordinates of a plurality of measurement points on each of the detected bearings. Extractor 30 sets at least one fixed measurement point from the plurality of measurement points. A fixed measurement point is a measurement point that is least likely to be affected by a load or the like and where a displacement is small. Extractor 30 calculates the coordinates of each measurement point in each frame included in the captured video and extracts a displacement at each measurement point. Extractor 30 may extract a displacement in each degree of freedom of each bearing from the displacement at each measurement point or may extract a component obtained in association with the plurality of degrees of freedom by performing a main component analysis of the movement of each bearing. Herein, extractor 30 may store, for example but not limited to, the coordinates of each measurement point in the video of each of the plurality of bearings and the displacement at each measurement point into a storage (not illustrated).

Next, corrector 40 corrects the dynamic feature of each of the plurality of bearings in accordance with the distance from image capturing device 101 that captures the video of each of the plurality of bearings (correcting step S40). At this point, for example, corrector 40 performs a scale correction on the displacement at each of the plurality of measurement points extracted by extractor 30 such that the ratio of the actually displaced distance at the plurality of measurement points is reflected. To be more specific, corrector 40 reads out, from a storage (not illustrated), the coordinates of each of the plurality of measurement points on each bearing in the real space and performs the scale correction described above with the use of the read-out coordinates in the real space.

Next, identifier 50 identifies, among the plurality of bearings, a bearing whose dynamic feature fails to match the dynamic features of the rest of the bearings based on the dynamic features corrected by corrector 40 (identifying step S51). Identifier 50 identifies, among the plurality of bearings, a bearing whose displacement corresponding to the plurality of degrees of freedom fails to match the displacements corresponding to the other plurality of degrees of freedom of the rest of the bearings based on the displacement in each degree of freedom of each bearing corrected by corrector 40. Specifically, this process is similar to the process described with reference to FIGS. 3, 6, and 7 in Embodiment 1 except that the corrected displacement in each degree of freedom of each bearing is used.

The process in step S40 does not necessarily have to be performed after step S30. The process in step S40 may be performed in parallel with the process in step S30 or may be performed before the process in step S30, for example.

Advantageous Effects and Others of Embodiment 2

Detection device 100*b* and the detection method according to Embodiment 2 described above provide the following advantageous effects in addition to the advantageous effects described in Embodiment 1.

Detection device 100*b* according to Embodiment 2 may include a corrector that corrects the dynamic feature of each of the plurality of bearings in accordance with the distance from an imager that captures a video, and the identifier may identify, among the plurality of bearings, a bearing whose dynamic feature fails to match the dynamic feature of one or more other bearings of the plurality of bearings based on the dynamic features corrected by the corrector.

This configuration makes it possible to calculate the dynamic feature of each of the plurality of bearings with higher accuracy. In addition, the use of the corrected dynamic features makes it possible to identify a bearing having a problem with higher accuracy.

Embodiment 3

Next, a detection device according to Embodiment 3 will be described. In the examples described in Embodiment 1 and Embodiment 2, neither detection device 100*a* nor detection device 100*b* includes an imager. Embodiment 3 differs from Embodiment 1 and Embodiment 2 in that the detection device includes an imager (not illustrated).

The detection device further includes an imager that captures synchronous videos of the plurality of bearings.

The detection device may include one or more imagers. For example, in a case where the detection device includes one imager, the one imager synchronously and simultaneously captures videos of the plurality of bearings. Meanwhile, in a case where the detection device includes two or more imagers, these imagers synchronously and simultaneously capture videos of the plurality of bearings.

In an operation of the detection device according to Embodiment 3, the detection device performs an image capturing step (not illustrated) in which the imager captures synchronous videos of the plurality of bearings, and this image capturing step is performed before step S20 described in Embodiment 1 and Embodiment 2.

Advantageous Effects

With the detection device according to Embodiment 3, since the detection device further includes the imager that captures synchronous videos of a plurality of bearings, the detection device can identify a bearing having a problem among the plurality of bearings even when no video is acquired from the outside.

Other Embodiments

Thus far, the detection device and the detection method according to one or more aspects of the present disclosure have been described based on the embodiments, but the present disclosure is not limited by these embodiments. Unless departing from the spirit of the present disclosure, an embodiment obtained by making various modifications that are conceivable by a person skilled in the art to the present embodiments or an embodiment obtained by combining the constituent elements in different embodiments may also be included within the scope of the one or more aspects of the present disclosure. For example, a part or the whole of the constituent elements included in the detection device according to the foregoing embodiments may be implemented by a single system large scale integration (LSI). For example, the detection device may be implemented by a system LSI having an acquirer, an extractor, and an identifier.

A system LSI is an ultra-multifunctional LSI manufactured by integrating a plurality of components on a single chip and is specifically a computer system that includes a microprocessor, a read only memory (ROM), a random access memory (RAM), and so on. The ROM stores a computer program. The microprocessor operates in accordance with the computer program, and thus the system LSI implements its functions.

Although a system LSI is illustrated above, depending on the difference in the degree of integration, it may also be called an IC, an LSI, a super LSI, or an ultra LSI. The technique for circuit integration is not limited to the LSI, and an integrated circuit may be implemented by a dedicated circuit or a general purpose processor. A field programmable gate array (FPGA) that can be programmed after an LSI is manufactured or a reconfigurable processor in which the connection or the setting of the circuit cell within the LSI can be reconfigured may also be used.

Furthermore, when a technique for circuit integration that replaces an appears through the advancement in the semiconductor technology or a derived different technique, the functional blocks may be integrated by using such a different technique. An application of biotechnology is a possibility, for example.

One aspect of the present disclosure is not limited to the detection device described above and may be implemented as a detection method that includes characteristic components included in the detection device in the form of steps. In addition, one aspect of the present disclosure may be a computer program that causes a computer to execute the characteristic steps included in the detection method. Furthermore, one aspect of the present disclosure may be a non-transitory computer readable recording medium that has such a computer program recorded therein.

In the foregoing embodiments, the constituent elements may each be implemented by dedicated hardware or may each be implemented through execution of a software program suitable for a corresponding constituent element. The constituent elements may each be implemented as a program executing unit, such as a central processing unit (CPO or a processor, reads out a software program recorded in a recording medium, such as a hard disk or a semiconductor memory, and executes the software program. Herein, the software that implements the detection device and so on of the foregoing embodiments is a program such as the one described below.

Specifically, this program causes a computer to execute a detection method of identifying, among a plurality of bearings displaceably supporting a structure, a bearing whose dynamic feature fails to match the dynamic features of the rest of the bearings, and the detection method includes acquiring synchronously captured videos of the plurality of bearings of the structure including the plurality of bearings, extracting the dynamic feature corresponding to a plurality of degrees of freedom of each of the plurality of bearings based on the acquired videos, and identifying, among the plurality of bearings, a bearing whose dynamic feature fails to match the dynamic features of the rest of the bearings.

In the foregoing embodiments, the identifier identifies, among the plurality of bearings, a bearing whose dynamic feature fails to match the dynamic features of the rest of the bearings. Alternatively, the identifier may determine whether the plurality of bearings include a bearing whose dynamic feature fails to match the dynamic features of the rest of the bearings.

In the foregoing embodiments, structure 2 including the plurality of bearings is a bridge girder or a bridge. Alternatively, structure 2 may be a building such as a house. When a bearing load is applied to a building due to an earthquake or the like, it can be determined whether a plurality of bearings include a bearing whose dynamic feature fails to match the dynamic features of the rest of the bearings, or a bearing whose dynamic feature fails to match the dynamic features of the rest of the bearings can be identified.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure can be widely used in detection devices that identify, among a plurality of bearings displaceably supporting a structure, a bearing whose dynamic feature fails to match the dynamic features of the rest of the bearings.

What is claimed is:

1. A detection device, comprising:
an acquirer that acquires a video of each of a plurality of bearings of a structure including the plurality of bearings, during a period in which a load applied to the structure is changing;
an extractor that extracts, for each of the plurality of bearings, (i) k displacements corresponding to k degrees of freedom of the bearing based on the video, and (ii) a dynamic feature of the bearing based on the k displacements, where k is an integer greater than or equal to two; and
an identifier that identifies, in the period and among the plurality of bearings, a bearing whose dynamic feature fails to match a dynamic feature of one or more other bearings of the plurality of bearings.

2. The detection device according to claim 1, wherein the bearing whose dynamic feature fails to match the dynamic feature of the one or more other bearings of the plurality of bearings is a bearing whose dynamic feature is neither identical nor symmetric to the dynamic feature of the one or more other bearings of the plurality of bearings.

3. The detection device according to claim 1, further comprising:
an imager that captures, as the video, synchronous videos of the plurality of bearings, wherein
the extractor extracts the dynamic feature for each of the plurality of bearings based on the synchronous videos.

4. The detection device according to claim 1, further comprising:
a corrector that corrects the dynamic feature of each of the plurality of bearings in accordance with a distance from an imager that captures the video, wherein
the identifier identifies, among the plurality of bearings, the bearing whose dynamic feature fails to match the dynamic feature of the one or more other bearings of the plurality of bearings based on a dynamic feature corrected by the corrector.

5. The detection device according to claim 1, wherein the structure is a bridge girder or a bridge.

6. The detection device according to claim 1, wherein the extractor extracts, for each of the plurality of bearings, a value composing a main component extracted by performing a main component analysis on the k displacements, as the dynamic feature.

7. The detection device according to claim 6, wherein the identifier identifies the bearing whose dynamic feature fails to match the dynamic feature of the one or more other bearings by comparing, among the plurality of bearings, a difference in a level of influence of each bearing in the main component obtained in association with the k degrees of freedom.

8. A detection method, comprising:
acquiring a video of each of a plurality of bearings of a structure including the plurality of bearings, during a period in which a load applied to the structure is changing;
extracting, for each of the plurality of bearings, (i) k displacements corresponding to k degrees of freedom of the bearing based on the video, and (ii) a dynamic feature of the bearing based on the k displacements, where k is an integer greater than or equal to two; and
identifying, in the period and among the plurality of bearings, a bearing whose dynamic feature fails to match a dynamic feature of one or more other bearings of the plurality of bearings.

9. The detection method according to claim 8, wherein the extracting includes extracting, for each of the plurality of bearings, a value composing a main component extracted by performing a main component analysis on the k displacements, as the dynamic feature.

* * * * *